(12) United States Patent
Liu et al.

(10) Patent No.: US 11,303,408 B2
(45) Date of Patent: Apr. 12, 2022

(54) REFERENCE SIGNAL TRANSMISSION AND RECEPTION METHOD AND APPARATUS FOR BEAM MANAGEMENT

(71) Applicant: NTT DOCOMO, INC., Tokyo (JP)

(72) Inventors: Min Liu, Beijing (CN); Chongning Na, Beijing (CN); Xin Wang, Beijing (CN); Jing Wang, Beijing (CN); Yuichi Kakishima, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 65 days.

(21) Appl. No.: 16/637,982

(22) PCT Filed: Aug. 9, 2018

(86) PCT No.: PCT/CN2018/099674
§ 371 (c)(1),
(2) Date: Feb. 10, 2020

(87) PCT Pub. No.: WO2019/029632
PCT Pub. Date: Feb. 14, 2019

(65) Prior Publication Data
US 2020/0220678 A1 Jul. 9, 2020

(30) Foreign Application Priority Data
Aug. 10, 2017 (CN) .......................... 201710682711.5

(51) Int. Cl.
*H04W 16/28* (2009.01)
*H04L 5/00* (2006.01)
*H04B 7/06* (2006.01)

(52) U.S. Cl.
CPC ......... *H04L 5/0048* (2013.01); *H04B 7/0617* (2013.01); *H04L 5/0053* (2013.01); *H04W 16/28* (2013.01)

(58) Field of Classification Search
CPC .... H04B 7/0695; H04B 7/088; H04B 7/0617; H04B 7/0626; H04B 7/0456; H04B 7/063;
(Continued)

(56) References Cited

U.S. PATENT DOCUMENTS 9,882,692 B2  1/2018  Kang et al.
10,313,911 B2  6/2019  Nagata et al.
(Continued)

FOREIGN PATENT DOCUMENTS

CN  105144612 A  12/2015
CN  105471559 A  4/2016
(Continued)

OTHER PUBLICATIONS

International Search Report issued in PCT/CN2018/099674 dated Oct. 29, 2018 (7 pages).
(Continued)

*Primary Examiner* — Eva Y Puente
(74) *Attorney, Agent, or Firm* — Osha Bergman Watanabe & Burton LLP

(57) ABSTRACT

A reference signal transmission and reception method is presented. The transmission method includes: transmitting a plurality of first reference signals; and transmitting a plurality of groups of second reference signals, where each first reference signal corresponds to one of the plurality of groups of second reference signal, and the group of second reference signals includes a plurality of second reference signals, where a part of reference signals in the group of second reference signals include quasi co-located information, and the quasi co-located information indicates a correlation between resources for the group of second reference signals
(Continued)

including the quasi co-located information and resources for the first reference signal corresponding to the group of second reference signals.

6 Claims, 5 Drawing Sheets

(58) Field of Classification Search
CPC .. H04B 7/0413; H04B 7/0628; H04B 17/318; H04B 7/06; H04B 7/0408; H04B 7/0632; H04B 7/024; H04W 72/042; H04W 72/046; H04W 72/0453; H04W 72/0446; H04W 72/1289; H04W 24/10; H04W 74/0833; H04W 72/04; H04W 72/0493; H04W 76/27; H04W 24/08; H04W 72/14; H04L 5/0048; H04L 5/0053; H04L 5/0051; H04L 5/0023; H04L 5/0094; H04L 5/005; H04L 5/0057; H04L 5/0091; H04L 5/0035; H04L 5/0044; H04L 1/0026; H04L 27/261; H04L 5/00
USPC .......................................... 370/329; 375/267
See application file for complete search history.

(56) References Cited

U.S. PATENT DOCUMENTS

| 2016/0223639 | A1  | 8/2016 | Davydov et al. |
| 2018/0115355 | A1  | 4/2018 | Nagata et al. |
| 2020/0127724 | A1* | 4/2020 | Kang .................... H04L 5/0023 |
| 2021/0126677 | A1* | 4/2021 | Park ...................... H04W 72/04 |
| 2021/0152302 | A1* | 5/2021 | Kwak ................. H04W 72/042 |
| 2021/0168788 | A1* | 6/2021 | Liu ..................... H04W 72/046 |

FOREIGN PATENT DOCUMENTS

| CN | 106160807 A    | 11/2016 |
| CN | 106301505 A    | 1/2017  |
| WO | 2016/122757 A1 | 8/2016  |

OTHER PUBLICATIONS

Written Opinion of the International Searching Authority issued in PCT/CN2018/099674 dated Oct. 29, 2018 (7 pages).
Ericsson; "The QCL framework in NR"; 3GPP TSG-RAN WG1 #89ah-NR, R1-1711051; Qingdao, China; Jun. 27-30, 2017 (6 pages).

* cited by examiner

300

400

REFERENCE SIGNAL TRANSMISSION AND RECEPTION METHOD AND APPARATUS FOR BEAM MANAGEMENT

CROSS-REFERENCE TO RELATED APPLICATIONS

This application is a 371 U.S. National Phase of International Application No. PCT/CN2018/099674, filed on Aug. 9, 2018, which claims priority to Chinese Application No. 201710682711.5, filed on Aug. 10, 2017. The entire disclosures of the above applications are incorporated herein by reference.

TECHNICAL FIELD

The present disclosure relates to a field of wireless communication, and in particular, to a reference signal transmission and reception method for beam management, and a corresponding base station and user equipment in a wireless communication system.

BACKGROUND

In order to improve transmission quality of wireless signals, it has been proposed that base stations use large-scale antenna arrays for wireless signal transmission. Compared with the number of antennas of traditional base stations, there are many antennas in a large-scale antenna array, and the wireless signals are effectively superimposed through beamforming, thereby resulting in a stronger signal gain and improving the transmission quality of wireless signals.

Beamforming may form a directional beam. However, once the direction of the directional beam deviates from a user, the user will not receive high-quality wireless signals on the contrary. Therefore, it is proposed that the base station uses beams to transmit quasi-location information among resources used by reference signals of the beams, so that the user equipment determines reception beams corresponding to transmission beams of the base station according to the quasi-location information. However, as the number of antennas in the large-scale antenna array increases, the quasi-location information among the resources indicating the reference signals of the beams also increases, and accordingly, resource overhead required by the base station to transmit the quasi-location information also increases.

Furthermore, as the number of antennas in the large-scale antenna array increases, resource mapping indications used to indicate the reference signals of the beams and indications that indicate the beams also increase, and accordingly, resource overhead required by the base station to transmit the resource mapping indications and the beam indications also increases.

SUMMARY OF THE INVENTION

According to one aspect of the present disclosure, there is provided a reference signal transmission method for beam management, which is performed by a base station, the method comprising: transmitting a plurality of first reference signals; transmitting a plurality of groups of second reference signals, wherein a first reference signal corresponds to a group of second reference signals, and the group of second reference signals includes a plurality of second reference signals, wherein a part of reference signals in the group of second reference signals include quasi co-located information, and the quasi co-located information indicates a correlation between resources for the group of second reference signals including the quasi co-located information and resources for the first reference signal corresponding to the group of second reference signals.

According to another aspect of the present disclosure, there is provided a reference signal reception method for beam management, which is performed by a user terminal, the method comprising: receiving a plurality of first reference signals; receiving a plurality of groups of second reference signals, wherein a first reference signal corresponds to a group of second reference signals, and the group of second reference signals includes a plurality of second reference signals, wherein a part of reference signals in the group of second reference signals include quasi co-located information, and the quasi co-located information indicates a correlation between resources for the group of second reference signals including the quasi co-located information and resources for the first reference signal corresponding to the group of second reference signals; determining reception beams corresponding to candidate transmission beams for the plurality of second reference signals in the group of second reference signals according to the quasi co-located information.

According to another aspect of the present disclosure, there is provided a base station comprising: a transmitting unit configured to transmit a plurality of first reference signals; the transmitting unit further configured to transmit a plurality of groups of second reference signals, where a first reference signal corresponds to a group of second reference signals, and the group of second reference signals includes a plurality of second reference signals; a processing unit configured to configure a part of reference signals in the group of second reference signals to include quasi co-located information, the quasi co-located information indicating a correlation between resources for the group of second reference signals including the quasi co-located information and resources for the first reference signal corresponding to the group of second reference signals.

According to another aspect of the present disclosure, there is provided a user terminal comprising: a receiving unit configured to receive a plurality of first reference signals; the receiving unit further configured to receive a plurality of groups of second reference signals, wherein a first reference signal corresponds to a group of second reference signals, and the group of second reference signals includes a plurality of second reference signals, wherein a part of reference signals in the group of second reference signals include quasi co-located information, and the quasi co-located information indicates a correlation between resources for the group of second reference signals including the quasi co-located information and resources for the first reference signal corresponding to the group of second reference signals; a processing unit configured to determine reception beams corresponding to candidate transmission beams for a plurality of second reference signals in the group of second reference signals.

The reference signal transmission method, reception method for beam management and the corresponding base station and user terminal according to the above aspects of the present disclosure effectively reduce the resource overhead required by the quasi-location information in a communication system which uses a large-scale antenna array.

Furthermore, according to another aspect of the present disclosure, there is provided a reference signal transmission method for beam management, which is performed by a base station, the method comprising: configuring a plurality of first reference signals; transmitting the plurality of first reference signals or a first part of first reference signals in the plurality of first reference signals for measurement.

According to another aspect of the present disclosure, there is provided a reference signal reception method for beam management, which is performed by a user terminal, the method including: receiving a plurality of first reference signals, the plurality of first reference signals configured by a base station for measurement, or the plurality of first reference signals configured by the base station to be active for measurement, or the plurality of first reference signals configured by the base station for reporting; determining reception beams corresponding to transmission beams for the plurality of first reference signals.

According to another aspect of the present disclosure, there is provided a base station comprising: a processing unit configured to configure a plurality of first reference signals; a transmitting unit configured to transmit the plurality of first reference signals or a first part of first reference signals in the plurality of first reference signals for measurement.

According to another aspect of the present disclosure, there is provided a user terminal comprising: a receiving unit configured to receive a plurality of first reference signals, the plurality of first reference signals configured by a base station for measurement, or the plurality of first reference signals configured by the base station to be active for measurement, or the plurality of first reference signals configured by the base station for reporting; a processing unit configured to determine reception beams corresponding to candidate transmission beams for the plurality of first reference signals.

The reference signal transmission method and reception method for beam management and the corresponding base station and user terminal according to the above aspects of the present disclosure effectively reduce the resource overhead required by resource mapping indications and beam indications in a communication system which uses a large-scale antenna array.

BRIEF DESCRIPTION OF THE DRAWINGS

In order to illustrate technical solutions of embodiments of the present disclosure clearly, the accompanying drawings required for use in the description of the embodiments are briefly introduced below. Obviously, the accompanying drawings in the following description are merely some embodiments of the present disclosure. Those skilled in the art may also obtain other accompanying drawings according to these accompanying drawings without creative labor.

DESCRIPTION OF THE EMBODIMENTS

Figure 1:
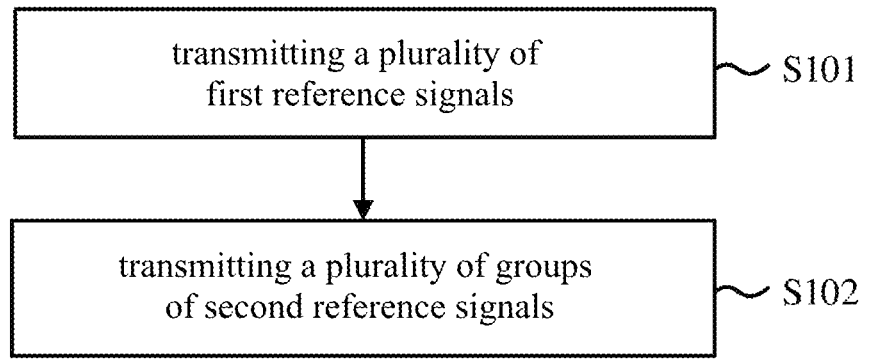
FIG. 1 shows a flowchart of a reference signal transmission method performed by a base station for beam management according to an embodiment of the present disclosure.

A reference signal transmission method and a base station according to embodiments of the present disclosure will be described below with reference to the accompanying drawings. The same reference numerals denote the same elements throughout the accompanying drawings. It should be understood that the embodiments described herein are merely illustrative and should not be construed as limiting the scope of the present disclosure. Furthermore, the base station may be a fixed station, a NodeB, an eNodeB (eNB), an access point, a transmitting point, a receiving point, a femto cell, a small cell, and the like, which are not limited herein. Furthermore, a User Equipment (UE) described herein may include various types of user equipment, such as a mobile terminal (also referred to as a mobile station) or a fixed terminal. However, for convenience, the UE and the mobile station sometimes may be used interchangeably hereinafter.

In the embodiments of the present disclosure, the base station uses a plurality of transmission beams with different directions to cover a cell in which the base station is located. In order to determine an optimal transmission beam for each UE in the cell in which the base station is located, the base station may use transmission beams with different directions to transmit reference signals to each UE. The UE measures the reference signals transmitted through the plurality of transmission beams and determines reception beams corresponding to respective transmission beams, and reports relevant measurement results to the base station. The base station then determines an optimal transmission beam aligned to each UE according to the measurement results of each UE.

In the conventional reference signal transmission methods, the base station uses beams to transmit quasi-location information among resources used by the reference signals of the beams, thereby assisting the user equipment to determine the reception beams corresponding to the transmission beams of the base station. However, as the number of antennas in a large-scale antenna array increases, the quasi-location information among the resources indicating the reference signals of the beams also increases, and resource mapping indications indicating resources used by the reference signals of the beams and indications indicating the beams also increases, and accordingly, resource overhead required by the base station to transmit the quasi-location information and resource overhead required by the base station to transmit the resource mapping indications and the beam indications also increase.

The embodiments of the present disclosure provide a reference signal transmission method and reception method for beam management, and a corresponding base station and user equipment to reduce resource overhead required for the quasi-location information and resource overhead required for the resource mapping indications and the beam indications in a communication system using large-scale antenna arrays.

Hereinafter, a reference signal transmission method for beam management performed by a base station according to one embodiment of the present disclosure is described with reference to FIG. 1. FIG. 1 shows a flowchart of a reference signal transmission method 100 for beam management.

As shown in FIG. 1, in step S101, a plurality of first reference signals are transmitted.

According to one example of the embodiment, a first reference signal transmitted in step S101 may be a first synchronization signal. For example, the first synchronization signal may be a Synchronization Signal (SS) used as the first reference signal. According to another example of the embodiment, the first reference signal may be a first channel state information reference signal. For example, the first channel state information reference signal may be a Channel State Information-Reference Signal (CSI-RS) used as the first reference signal.

Furthermore, according to another example of the embodiment, resources occupied by the first reference signal may be one resource block in a reference signal resource pool. For example, when the first reference signal is a SS, the resources occupied by the first reference signal is one SS resource block (hereinafter referred to as "SS block") in an SS resource pool. For another example, when the first reference signal is a CSI-RS, the resources occupied by the first reference signal is one CSI-RS resource block (hereinafter referred to as "CSI-RS block") in a CSI-RS resource pool.

Furthermore, in practical applications, the first reference signal may include a resource mapping indication corresponding to the first reference signal, to indicate the resource block occupied by the first reference signal. For example, the first reference signal may include a resource mapping indication SS block #1 to indicate that the resource block occupied by the first reference signal is the first SS block in the resource pool. For another example, the first reference signal may include a resource mapping indication CSI-RS block #2 to indicate that the resource block occupied by the first reference signal is the second CSI-RS block in the resource pool.

According to another example of the embodiment, the first reference signals may be transmitted through a plurality of first beams. Furthermore, a first beam may be a beam with a wide coverage range (hereinafter referred to as a "wide beam"). The base station may transmit a first reference signal corresponding to each wide beam on the wide beam.

In step S102, a plurality of groups of second reference signals are transmitted, where a first reference signal corresponds to a group of second reference signals, and the group of second reference signals includes a plurality of second reference signals. Furthermore, a part of reference signals in the group of second reference signals include quasi co-located information, and the quasi co-located information indicates a correlation between resources for the group of second reference signals including the quasi co-located information and resources for the first reference signal corresponding to the group of second reference signals.

For example, the second reference signal may be a second Channel State Information Reference Signal (CSI-RS). For another example, the second channel state information reference signal may be a Demodulation Reference Signal (DM-RS).

According to another example of the embodiment, similar to the first reference signal, resources occupied by the second reference signal may be one resource block in a reference signal resource pool. For example, when the second reference signal is a CSI-RS, the resources occupied by the second reference signal is one CSI-RS block. For another example, when the second reference signal is a DM-RS, the resources occupied by the second reference signal is one DM-RS block.

Furthermore, in practical applications, the second reference signal may include a resource mapping indication corresponding to the second reference signal, to indicate the resource block occupied by the second reference signal. For example, the second reference signal may include a resource mapping indication CSI-RS block #3 to indicate that the resource block occupied by the second reference signal is the third CSI-RS block in the resource pool. For another example, the second reference signal may include a resource mapping indication DM-RS block #4 to indicate that the resource block occupied by the second reference signal is the fourth DM-RS block in the resource pool.

According to another example of the embodiment, in step S102, the groups of second reference signals may be transmitted through a plurality of groups of second beams, where the first beam and one group of the plurality of groups of second beams may correspond one-to-one, or may not correspond one-to-one. For example, each group of second beams may transmit a group of second reference signals. According to one example of the present disclosure, each second beam in the group of second beams may be a beam with a narrow coverage range (hereinafter referred to as a "narrow beam").

According to another example of the embodiment, in step S102, the groups of second reference signals may be transmitted through a plurality of groups of second beams, where each first beam corresponds to one group of the plurality of groups of second beams. For example, each group of second beams may transmit a group of second reference signals. According to one example of the present disclosure, each second beam in the group of second beams may be a beam with a narrow coverage range (hereinafter referred to as a "narrow beam").

In the following, taking the case that the first beam and one group of the plurality of groups of second beams may correspond one-to-one as an example, the plurality of first reference signals and the plurality of first beams mentioned above will be further described in conjunction with Table 1, FIG. 2 and FIG. 3, and a relationship between the plurality of first reference signals, the plurality of first beams and the plurality of groups of second reference signals, the plurality of groups of second beams and the plurality of second reference signals is further described herein. For example, the base station has a plurality of first beams (that is, a plurality of wide beams), and each first beam (that is, each wide beam) in the plurality of first beams corresponds to one group of second beams, and each group of second beams include a plurality of second beams (that is, a plurality of narrow beams). The base station then transmits a first reference signal corresponding to each first beam on the first beam (that is, each wide beam), and transmits a second reference signal corresponding to each second beam on the second beam (that is, each narrow beam).

For another example, the base station has N wide beams, numbered by B1-1, B1-2, ..., B1-$i$, ... B1-N, respectively, where i is a positive integer and 1≤i≤N, and the base station has N groups of second beams, numbered by B2-1, B2-2, ..., B2-$i$, ... B2-N, respectively, where i is a positive integer and 1≤i≤N, and a wide beam B1-$i$ corresponds to a group of second beams B2-$i$. Moreover, the group of second beams B2-$i$ includes M narrow beams numbered by B2-$i$-1, B2-$i$-2, ..., B2-$i$-r, ... B2-$i$-M, respectively, where r is a positive integer and 1≤r≤M. In other words, the wide beam B1-$i$ corresponds to the M narrow beams in the group of second beams B2-$i$. Furthermore, a coverage range of the wide beam B1-$i$ may include coverage ranges of the M narrow beams in the group of second beams B2-$i$. In order to describe these correspondences more clearly, Table 1 shows the correspondences among the first beams, the groups of second beams, and the second beams in the groups of second beams.

TABLE 1

Correspondences among the first beams, the groups of second beams, and the second beams in the groups of second beams

| first beam (wide beam) | group of second beams | second beams in the groups of second beams (narrow beams) |
|---|---|---|
| B1-1 | B2-1 | ... |
| B1-2 | B2-2 | ... |
| ... | ... | ... |
| B1-i | B2-i | B2-i-1 |
|  |  | B2-i-2 |
|  |  | ... |
|  |  | B2-i-r |
|  |  | ... |
|  |  | B2-i-M |
| ... | ... | ... |
| B1-N | B2-N | ... |

For another example, the base station needs to transmit N first reference signals numbered by S1-1, S1-2, ..., S1-$i$, ... S1-N, respectively, where i is a positive integer and 1≤i≤N. The base station then transmits a first reference signal S1-$i$ on a wide beam B1-$i$. Furthermore, the base station also needs to transmit N groups of second reference signals numbered by S2-1, S2-2, ..., S2-$i$, ... S2-N, respectively, where i is a positive integer and 1≤i≤N. And, the first reference signal S1-$i$ corresponds to a group of second reference signals S2-$i$. Moreover, the group of second reference signals S2-$i$ includes M second beams numbered by S2-$i$-1, S2-$i$-2, ..., S2-$i$-r, ... S2-$i$-M, respectively, where r is a positive integer, and 1≤r≤M. In other words, the first reference signal S1-$i$ corresponds to the M second beams in the group of second reference signals S2-$i$. The base station then transmits the group of second reference signals S2-$i$ on the group of second beams B2-$i$. Furthermore, the base station transmits a second reference signal S2-$i$-r in the group of second reference signals S2-$i$ on a narrow beam B2-$i$-r in the group of second beams B2-$i$.

Figure 2:
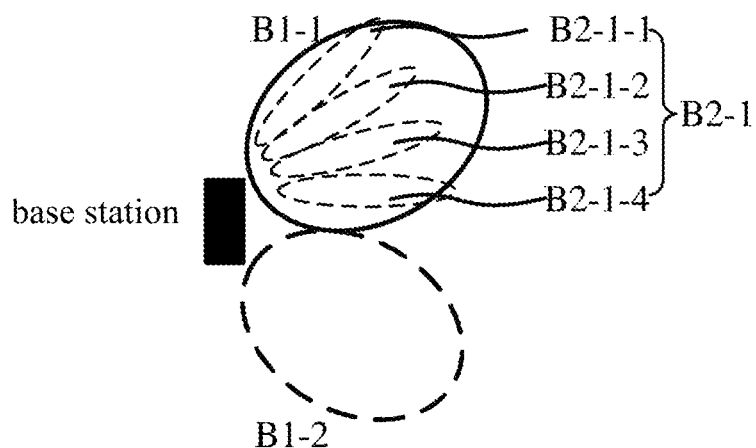
FIG. 2 shows correspondences among first reference signals, groups of second reference signals, and second reference signals in the second reference signal groups, and correspondences between respective reference signals and respective beams.

In order to describe these correspondences more clearly, FIG. 2 shows the correspondences among the first reference signal, the groups of second reference signals, and the second reference signals in the groups of second signals, and the correspondences between respective reference signals and respective beams. As shown in FIG. 2, the bold solid ellipse represents a first beam B1-1, which is used to transmit a first reference signal S1-1, and the bold dashed ellipse represents a first beam B1-2, which is used to transmit a first reference signal S1-2; furthermore, the four thin dashed ellipses represent a second beam B2-1-1, a second beam B2-1-2, a second beam B2-1-3, and a second beam B2-1-4, respectively, which are used for transmitting a second reference signal S2-1-1, a second reference signal S2-1-2, a second reference signal S2-1-3, and a second reference signal S2-1-4, respectively. As can be seen from FIG. 2, the second beam B2-1-1, the second beam B2-1-2, the second beam B2-1-3, and the second beam B2-1-4 form a group of second beams B2-1 corresponding to the first beam B1-1, and the second reference signal S2-1-1, the second reference signal S2-1-2, the second reference signal S2-1-3, and the second reference signal S2-1-4 form a group of second reference signals S2-1 corresponding to the first reference signal S1-1.

According to another example of the embodiment, in step S102, the plurality of second reference signals included in each group of second reference signals may be a plurality of adjacent second reference signals. For example, the plurality of adjacent second reference signals may be second reference signals that occupy adjacent resource blocks. For example, FIG. 3$a$ shows a schematic diagram of one group of second reference signals in hybrid beamforming. As shown in FIG. 3$a$, four second reference signals are transmitted in one time slot, and resources occupied by the four second reference signals are 310$a$, 320$a$, 330$a$, and 340$a$, respectively. Frequency resources of the four resource blocks are adjacent, hence the four second reference signals can be considered to be adjacent, so that the four second reference signals form one group of second reference signals.

Figures 3A, 3B:
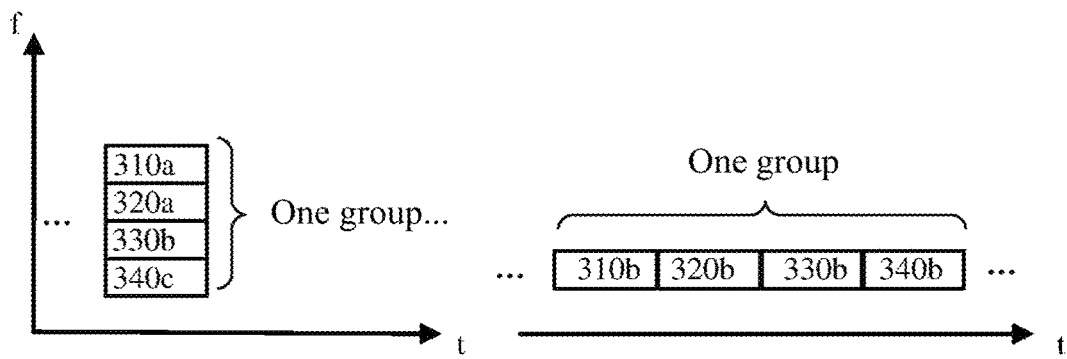
FIG. 3a shows a schematic diagram of one group of second reference signals in hybrid beamforming.
FIG. 3b shows a schematic diagram of one group of second reference signals in analog beamforming.

For another example, FIG. 3$b$ shows a schematic diagram of one group of second reference signals in analog beamforming. As shown in FIG. 3$b$, four second reference signals are transmitted in a continuous period of time, and resources occupied by the four second reference signals are 310$b$, 320$b$, 330$b$, and 340$b$, respectively. Time resources of the four resource blocks are adjacent, hence the four second reference signals can be considered to be adjacent, so that the four second reference signals form one group of second reference signals. In practical applications, a division for groups of second reference signals may be implemented in various ways. For example, the base station may periodically generate one activation instruction and one deactivation instruction for dividing groups of second reference signals, and a plurality of second reference signals transmitted between the activation instruction and the deactivation instruction may form one group of second reference signals. For another example, the base station may also select one group of second reference signals aperiodically. For example, the base station may obtain a second time after counting a period of time from a first time, and select second reference signals transmitted between the first time and the second time to form one group of second reference signals.

According to another example of the embodiment, the first reference signal in step S101 may include configuration information, such as resource type, period, offset, antenna port number, resource or resource pool number, etc., for the SS or CSI-RS described in the prior art.

According to one example of the embodiment, the second reference signal in step S102 further includes Quasi Co-Located information (QCL) on the basis of including configuration information for the CSI-RS or DM-RS described in the prior art, and the quasi co-located information indicates a correlation between resources for the group of second reference signals including the quasi co-located information and resources for the first reference signal corresponding to the group of second reference signals. For example, the quasi co-located information may indicate a correlation between two antenna ports, where one antenna port of the two antenna ports may infer channel attributes for signals transmitted by itself that are sent on a channel, through signals transmitted by the other antenna port that are sent on the channel. The channel attributes may include, for example, one or more delay spreads, Doppler spreads, Doppler frequency shifts, average gains, average delays, and the like. In practical applications, the quasi co-located information may be represented by a correlation among resources used by signals. As it should be, the present disclosure is not limited hereto, and other embodiments are also possible.

As mentioned above, the first reference signal may be a first SS or a first CSI-RS, and the second reference signal may be a second CSI-RS or DM-RS. In step S102, for example, when each first reference signal in the plurality of first reference signals is a first SS and the second reference signal is a second CSI-RS, the quasi co-located information included in a part of reference signals in the group of second reference signals indicates a correlation between resources for the second CSI-RSs in the group of second reference signals including the quasi co-located information and resources for the first SS corresponding to the group of second reference signals. For another example, when each first reference signal in the plurality of first reference signals is a first CSI-RS and the second reference signal is a second CSI-RS, the quasi co-located information included in a part of reference signals in the group of second reference signals indicates a correlation between resources for the second CSI-RSs in the group of second reference signals including the quasi co-located information and resources for the first CSI-RS corresponding to the group of second reference signals.

As it should be, the invention of the embodiment is not limited hereto. In step S102, information indicated by the quasi co-located information included in a part of reference signals in the group of second reference signals when the second reference signal is a DM-RS, is different from information indicated by the quasi co-located information included in a part of reference signals in the group of second reference signals when the second reference signal is a CSI-RS. For example, when each first reference signal of the plurality of first reference signals is a first SS and the second reference signal is a DM-RS, the quasi co-located information included in a part of reference signals in the group of second reference signals indicates a correlation between resources for the DM-RSs in the group of second reference signals including the quasi co-located information and resources for the first SS corresponding to the group of second reference signals. For another example, when each first reference signal of the plurality of first reference signals is a first CSI-RS, and the second reference signal is a DM-RS, the quasi co-located information included in a part of reference signals in the group of second reference signals indicates a correlation between resources for the DM-RSs in the group of second reference signals including the quasi co-located information and resources for the first CSI-RS corresponding to the group of second reference signals.

Furthermore, some of the plurality of first reference signals may be first SSs, while others may be first CSI-RSs. That is, there are first type of first reference signals and second type of first reference signals in the plurality of first reference signals.

In this case, in step S102, the second reference signal may be a second CSI-RS. Then, a part of reference signals in a group of second reference signals corresponding to the first type of first reference signal include quasi co-located information, and the quasi co-located information indicates a correlation between resources for the second CSI-RSs in the group of second reference signals corresponding to the first type of first reference signal and resources for the first SS, where the first SS may be a SS corresponding to the group of second reference signals corresponding to the first type of first reference signal. A part of reference signals in a group of second reference signals corresponding to the second type of first reference signal include quasi co-located information, and the quasi co-located information indicates a correlation between resources for the second CSI-RSs in the group of second reference signals corresponding to the second type of first reference signal and resources for the first CSI-RS, where the first CSI-RS may be a CSI-RS corresponding to the group of second reference signals corresponding to the second type of first reference signal.

As it should be, in this case, when the second reference signal may also be a DM-RS, then a part of reference signals in the group of second reference signals corresponding to the first type of first reference signal include quasi co-located information, and the quasi co-located information indicates a correlation between resources for the DM-RSs in the group of second reference signals corresponding to the first type of first reference signal and resources for the first SS. A part of reference signals in the group of second reference signals corresponding to the second type of first reference signal include quasi co-located information, and the quasi co-located information indicates a correlation between resources for the DM-RSs in the group of second reference signals corresponding to the second type of first reference signal and resources for the first CSI-RS.

Furthermore, according to another example of the embodiment, in step S102, before transmitting the plurality of groups of second reference signals, the base station may configure each group of second reference signals. For example, for each group of second reference signals, the group of second reference signals is configured to include a plurality of second reference signals, and a part of reference signals in the group of second reference signals are configured to include the quasi co-located information that has been described in detail above. The quasi co-located information is used to indicate a correlation between resources for the group of second reference signals including the quasi-colocation information and resources for the first reference signal corresponding to the group of second reference signals, so that after receiving the group of second reference signals, the UE may determine reception beams corresponding to candidate transmission beams for the plurality of second reference signals in the group of second reference signals through information on the resources for the first reference signal and the quasi co-located information.

In the example, a part of reference signals in the group of second reference signals are configured to include the quasi co-located information that has been described in detail above, rather than all reference signals in the group of second reference signals being configured to include the quasi co-located information. It may also ensure that, after receiving the group of second reference signals, the UE may determine the reception beams corresponding to the candidate transmission beams for the plurality of second reference signals in the group of second reference signals. This is because, as mentioned above, the plurality of second reference signals in the group of second reference signals are adjacent reference signals, the channel attributes of the plurality of second reference signals in the group of second reference signals are similar. Therefore, the UE may use a same reception beam to correspond to the candidate transmission beams for the plurality of second reference signals in the group of second reference signals.

For another example, for each group of second reference signals, the base station may configure the group of second reference signals to include a plurality of second reference signals, and configure one reference signal in the group of second reference signals to include the quasi co-located information that has been described in detail above. For instance, the second reference signal S2-$i$-r in the group of second reference signals S2-$i$ mentioned above is configured to include the quasi co-located information, and the quasi co-located information is used to indicate a correlation between resources for the group of second reference signals S2-$i$ and resources for the first reference signal S1-$i$ corresponding to the group of second reference signals S2-$i$, so that after receiving the group of second reference signals S2-$i$, the UE may determine reception beams corresponding to candidate transmission beams of the second reference signals S2-$i$-1, S2-$i$-2, . . . , S2-$i$-r, . . . S2-$i$-M in the group of second reference signals S2-$i$ through the quasi co-located information, where r is a positive integer and $1 \leq r \leq M$.

As mentioned above, in step S101, the base station transmits the first reference signals on the first beams (that is, the wide beams). After receiving the first reference signals, the UE may determine reception beams corresponding to candidate transmission beams for the first reference signals. A process of the determination may adopt technical solutions in the prior art, and the details are not described herein again.

Furthermore, as mentioned above, in step S102, the base station transmits the second reference signals on the second beams (that is, the narrow beams). According to another example of the present disclosure, after receiving the second reference signals, the UE may determine reception beams corresponding to candidate transmission beams for the second reference signals, by indicating a correlation between resources for the group of second reference signals including the quasi co-located information and resources for the first reference signal corresponding to the group of second reference signals. For example, after receiving the second reference signals, the UE may judge whether the channel attributes of the first beam (that is, the wide beam) and the second beam (that is, the narrow beam) are similar by indicating a correlation between resources for the group of second reference signals including the quasi co-located information and resources for the first reference signal corresponding to the group of second reference signals. If they are similar, the reception beam corresponding to the candidate transmission beam for the second reference signal may be determined to be the one same as the reception beam corresponding to the candidate transmission beam for the first reference signal.

That is, two determination processes are described herein. The first determination is to determine the reception beam corresponding to the candidate transmission beam (wide beam) for the first reference signal, and the second determination is to determine the reception beam corresponding to the candidate transmission beam for the second beams (narrow beams) in the group of second beams corresponding to a first beam, finally accurately realizing correspondences between the narrow beams from the base station and the reception beams from the UE, and ensuring that a reception beam from the UE may correspond to the optimal transmission beam from the base station. Therefore, the first determination process may be considered as a process that preliminary determines the correspondences between the transmission beams from the base station and the reception beams from the UE, which may be simply referred to as the "P1 process", and the second determination process may be considered as a process that subtly determines the correspondences between the transmission beams from the base station and the reception beams from the UE, which also be simply referred to as a "P2 process".

Figure 4:
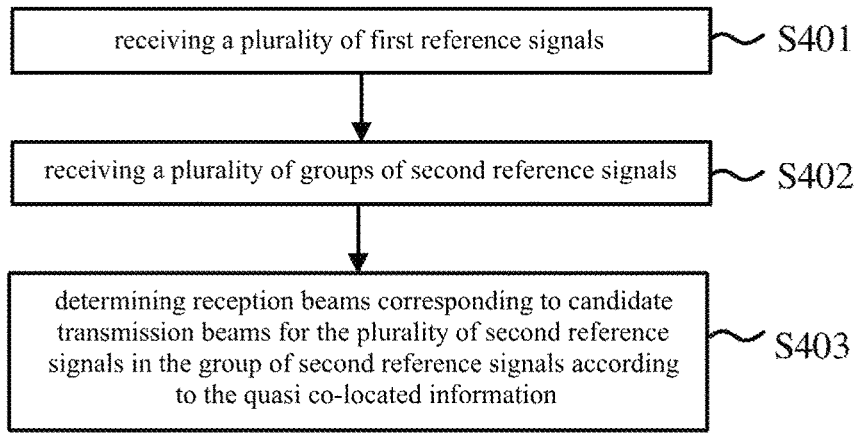
FIG. 4 shows a flowchart of a reception method performed by a user equipment corresponding to the transmission method shown in FIG. 1 according to an embodiment of the present disclosure.

FIG. 4 describes a reception method performed by a user equipment corresponding to a transmission method shown in FIG. 1 according to an embodiment of the present disclosure. FIG. 4 shows a flowchart of a reference signal reception method 400 for beam management.

As shown in FIG. 4, in step S401, a plurality of first reference signals are received. Then, in step S402, a plurality of groups of second reference signals are received, where a first reference signal corresponds to a group of second reference signals, and the group of second reference signals includes a plurality of second reference signals, where a part of reference signals in the group of second reference signals include quasi co-located information, and the quasi co-located information indicates a correlation between resources for the group of second reference signals including the quasi co-located information and resources for the first reference signal corresponding to the group of second reference signals. In step S403, reception beams corresponding to candidate transmission beams for the plurality of second reference signals in the group of second reference signals are determined according to the quasi co-located information.

According to one example of the embodiment, in step S403, after receiving first reference signals transmitted through first beams (that is, wide beams), the UE may determine reception beams corresponding to candidate transmission beams for the first reference signal.

According to another example of the embodiment, in step S403, after receiving second reference signals transmitted on second beams (that is, narrow beams) in a group of second beams corresponding to the first beam, the UE may determine reception beams corresponding to candidate transmission beams for the second reference signals, by indicating a correlation between resources for the group of second reference signals including the quasi co-located information and resources for the first reference signal corresponding to the group of second reference signals. For example, the UE may judge whether channel attributes of the first beam (that is, the wide beam) and the second beam (that is, the narrow beam) are similar, by indicating a correlation between resources for the group of second reference signals including the quasi co-located information and resources for the first reference signal corresponding to the group of second reference signals. If they are similar, the reception beam corresponding to the candidate transmission beams for the second reference signal may be determined to be the one same as the reception beam corresponding to the candidate transmission beam for the first reference signal, finally accurately realizing correspondences between the narrow beams from the base station and the reception beams from the UE, and ensuring that a reception beam from the UE may correspond to the optimal transmission beam from the base station.

The above-mentioned transmission method shown in FIG. 1 and the reception method shown in FIG. 4 are to realize the correspondences between the candidate transmission beams from the base station and the reception beams from the UE, thereby ensuring that a reception beam from the UE may correspond to the optimal transmission beam from the base station. However, the above-mentioned transmission method shown in FIG. 1 may also be performed by the user equipment, while the reception method shown in FIG. 4 is performed by the base station, thereby realizing correspondences between transmission beams from the UE and the reception beams from the base station, thereby ensuring that a reception beam from the base station may correspond to the optimal transmission beam from the UE, which is not limited in the present disclosure.

With the embodiment, the base station configures, quasi co-located information between resources for one group of second reference signals and resources for a first reference signal corresponding to the group of second reference signals, to be transmitted in a part of reference signals in the group of second reference signals, instead of transmitting, quasi co-located information between resources for each reference signal in the group of second reference signals and resources for a first reference signal corresponding to the group of second reference signals, in each reference signal in the group of second reference signals, thereby achieving a goal of reducing resource overhead required for quasi-location information among resources for reference signals.

Figure 5:
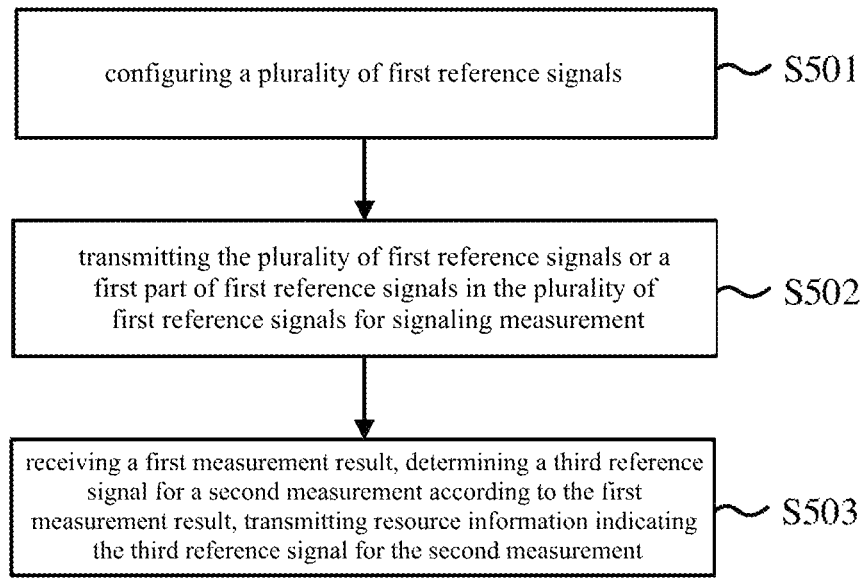
FIG. 5 shows a flowchart of another reference signal transmission method performed by a base station for beam management according to another embodiment of the present disclosure.

FIG. 5 describes a reference signal transmission method for beam management performed by a base station according to another embodiment of the present disclosure. FIG. 5 shows a flowchart of another reference signal transmission method 500 for beam management.

As shown in FIG. 5, in step S501, a plurality of first reference signals are configured.

According to one example of the embodiment, a first reference signal may be a first reference signal in the method 100 described above in conjunction with FIG. 1, or may be a second reference signal in the method 100.

According to another example of the embodiment, when the base station configures the first reference signal, the first reference signal may be configured through signaling. For example, the first reference signal is configured through Radio Resource Control (RRC) signaling.

In step S502, the plurality of first reference signals or a first part of first reference signals in the plurality of first reference signals are transmitted for measurement.

According to one example of the embodiment, in step S501, the base station may transmit the first reference signal through a first beam or a second beam. As mentioned above, the first reference signal may be a first reference signal in the method 100 described above in connection with FIG. 1, and therefore, in the example, the first reference signal may be transmitted through a first beam in the method 100 described in connection with FIG. 1. Furthermore, the first reference signal may be a second reference signal in the method 100 described above in connection with FIG. 1, and therefore, in the example, the first reference signal may be transmitted through a second beam in the method 100 described in connection with FIG. 1.

In addition, in the example, a corresponding first reference signal may be transmitted on each first beam in a plurality of first beams, or a corresponding first reference signal may be transmitted on a part of first beams in the plurality of first beams. Alternatively, a corresponding first reference signal may also be transmitted on each second beam in a plurality of second beams, and a corresponding first reference signal may also be transmitted on a part of second beams in the plurality of second beams.

According to one example of the embodiment, in step S501, the base station may further configure the first part of first reference signals in the plurality of first reference signals to be activated for measurement. For example, the number of the plurality of first reference signals is 16, and the number of the first part of first reference signals in the 16 first reference signals is 8, and the 8 first reference signals are further configured to be activated for measurement. As it should be, the first part of first reference signals may be further configured to be active for reporting, and the first part of first reference signals may be further configured to be active for measurement or reporting.

In the example, when the base station configures the first part of first reference signals, the first part of first reference signals may be configured through signaling. For example, the first part of first reference signals are configured through RRC signaling or Media Access Control Control Element (MAC CE) signaling. In the example, the base station may further use a second part of first reference signals in the first part of first reference signals for reporting. For example, the number of the plurality of first reference signals is 16, and the number of the first part of first reference signals in the 16 first reference signals is 8, and the number of the second part of first reference signals in the 8 first reference signals is 4, and the 4 first reference signals are further configured for reporting.

Furthermore, when the base station configures the second part of first reference signals, the first part of first reference signals may be configured through signaling. For example, the second part of first reference signals are configured through RRC signaling, or MAC CE signaling, or Downlink Control Information (DCI) signaling. Moreover, resources occupied by the second part of first reference signals may be part or all of resources used for RRC signaling, or MAC CE signaling, or DCI signaling.

That is, the base station configures the plurality of first reference signals into different levels according to actual needs. Alternatively, the plurality of first reference signals may be configured into different sets, for example, configured as a plurality of levels or a plurality of sets. For instance, the plurality of first reference signals are configured into three levels (or sets), where a first level (or set) of first reference signals is configured for measurement, and a second level (or set) of first reference signals is configured to be active for measurement, and a third level (or set) of first reference signals is configured for reporting. Although, in the embodiment, only three levels (or sets) are introduced, in actual operations, less than three or more than three levels (or sets) may be divided according to specific situations. In the prior art, the base station does not configure the plurality of first reference signals into a plurality of levels (or sets), which results in that, the base station needs to transmit all reference signals in the plurality of first reference signals and transmit beam indications of all reference signals in the plurality of first reference signals each time for measurement by a UE in order to determine reception beams from the UE.

In the example, the base station may configure the plurality of first reference signals into different levels (or sets), and then choose to transmit different levels (or sets) of first reference signals according to actual needs. Therefore, the base station does not need to transmit all reference signals in the plurality of first reference signals and corresponding beam indications each time, thereby reducing overhead required for transmitting resource mapping indications of the reference signals and the corresponding beam indications.

For example, the number of the plurality of first reference signals is 16, and in step S501, 8 of the 16 first reference signals are further configured to be active for measurement, and 4 of the 8 first reference signals are further configured for reporting. If the base station only needs to transmit 8 of the 16 first reference signals according to actual needs, in step S502, the number of the resource mapping indications required by base station for transmitting 8 first reference signals is 8, and 3 bits are required to transmit the resource mapping indications. The number of beams for transmitting 8 first reference signal is 8, that is, the number of the corresponding beam indications is 8, and 3 bits are required to transmit the beam indications. A total overhead of 6 bits is required, which obviously saves the overhead compared with the prior art where all of the 16 first reference signals are transmitted. For another example, if the base station only needs to transmit 4 of the 8 first reference signals according to actual needs, in step S502, the number of the resource mapping indications required by base station for transmitting 4 first reference signals is 4, and 2 bits are required to transmit the resource mapping indications. The number of beams for transmitting 4 first reference signal is 4, that is, the number of the corresponding beam indications is 4, and 2 bits are required to transmit the beam indications. A total overhead of 4 bits is required, which obviously saves the overhead compared with the prior art where all of the 16 first reference signals are transmitted.

As mentioned above, the base station may configure the plurality of first reference signals into a plurality of levels (or sets), and then choose to transmit different levels (or sets) of first reference signals according to actual needs. The actual needs may be that, for example, if a location of the UE changes, a direction of a previously determined optimal transmission beam from the base station may deviate from the UE, and as a result, the UE may not receive high-quality wireless signals. In this case, The UE may transmit request information for reselecting an optimal transmission beam from the base station to the base station. After receiving the request information, the base station does not need to transmit to the user the first reference signals corresponding to all beams on all beams including the previously determined optimal transmission beam from the base station, and does not need to transmit to the user the beam indications of all beams for measurement by the UE in order to determine the reception beam from the UE. Therefore, the base station only needs to transmit a first reference signal corresponding to an adjacent beam of the previously determined optimal transmission beam from the base station and the beam indication of the adjacent beam.

According to another example of the embodiment, in step S501, the base station may configure a plurality of groups of second reference signals, where each group of second reference signals includes a plurality of second reference signals, and a part of reference signals in each group of second reference signals may also include quasi co-located information. Then, the base station transmits the plurality of groups of second reference signals. In the example in which the base station configures a plurality of groups of second reference signals, the first reference signal configured by the base station is similar to the first reference signal in the method 100, and the configured group of second reference signals is similar to the group of second reference signals in the method 100, which are not described in detail herein again.

In step S501, for the quasi co-located information included in a part of reference signals in each group of second reference signals, it may be configured in the following manner. For example, when the group of second reference signals corresponds to one first reference signal of the plurality of first reference signals, a part of reference signals in the group of second reference signals are configured to include quasi co-located information, and the quasi co-located information indicates a correlation between resources for the group of second reference signals and resources for one first reference signal in the plurality of first reference signals. When the group of second reference signals corresponds to one first reference signal in the first part of first reference signals, a part of reference signals in the group of second reference signals are configured to include quasi co-located information, and the quasi co-located information indicates a correlation between resources for the group of second reference signals and resources for one first reference signal in the first part of first reference signals. When the group of second reference signals corresponds to one first reference signal in the second part of first reference signals, a part of reference signals in the group of second reference signals are configured to include quasi co-located information, and the quasi co-located information indicates a correlation between resources for the group of second reference signals and resources for one first reference signal in the second part of first reference signals.

That is, for the different levels (or sets) of first reference signals mentioned above, a configuration manner of the quasi co-located information included in a part of reference signals in each group of second reference signals is different.

According to one example of the embodiment, after step S502, the base station may further perform step S503, that is, receive a first measurement result, where the first measurement result is a result of performing a first measurement on the first reference signal; determine a third reference signal for a second measurement according to the first measurement result; and transmit resource information indicating the third reference signal for the second measurement, where the third reference signal includes a third reference signal used for measurement but not used for reporting; or a third reference signal used for measurement but not activated; or a third reference signal activated but not used for reporting.

In step S503, the first measurement result may be a first measurement performed by the UE on the reference signal transmitted by the base station, or may be one measurement in a plurality of measurements performed by the UE on the reference signal transmitted by the base station.

In step S503, after receiving the first measurement result, the base station may determine a reference signal for a next measurement (that is, a third reference signal used for the second measurement) according to the first measurement result. The third reference signal may be the same as or different from the first reference signal during the first measurement, which is determined by the base station according to the actual channel condition and is not limited in the present disclosure.

For example, the third reference signal may be the same as a part of the first reference signals during the first measurement. As mentioned above, since the base station configures the plurality of first reference signals into three levels (or sets) according to actual needs, the base station may transmit a first level (or set) of first reference signals during the first measurement, and may transmit a second level (or set) of first reference signals or a third level (or set) of first reference signals during the second measurement, so that the UE may quickly determine the optimal transmission beam from the base station. For another example, the base station may transmit 16 first reference signals at the first level (or set) during the first measurement, and may transmit 8 first reference signals at the second level (or set) in the 16 first reference signals or 4 first reference signals at the third level (or set) in the 8 first reference signals during the second measurement.

For another example, the third reference signal may be different from the first reference signal during the first measurement. For instance, the base station may transmit 16 first reference signals at the first level (or set) during the first measurement, and then the third reference signals may be the first reference signals that are not at the third level (or set) in the 16 first reference signals at the first level (or set), and may also be the first reference signals that are not at the second level (or set) in the 16 first reference signals at the first level (or set), and may also be the first reference signals that are not at the third level (or set) in the 8 first reference signals at the second level (or set).

In step S503, after determining the reference signal for the next measurement (that is, the third reference signal for the second measurement), the base station may transmit to the UE the resource information indicating the third reference signal for the second measurement for measurement by the UE to determine the optimal transmission beam from the base station. For example, the resource information of the third reference signal may include an indication of a beam for transmitting the third reference signal.

As mentioned above, since the base station configures the plurality of first reference signals into three levels (or sets) according to actual needs, in the example, overhead required for the beam indications transmitted by the base station is also reduced. For example, when the base station may transmit 8 first reference signals at the second level (or set) in the 16 first reference signals at the first level (or set) during the second measurement, the number of the corresponding beam indications transmitted by the base station is 8 and only 3 bits are required, which obviously saves the overhead compared with the prior art where all of the 16 first reference signals are transmitted. When the base station transmits 4 first reference signals at the third level (or set) in the 8 first reference signals, the number of the corresponding beam indications transmitted by the base station is 4 and only 2 bits are required, which obviously saves the overhead compared with the prior art where all of the 16 first reference signals are transmitted.

Figure 6:
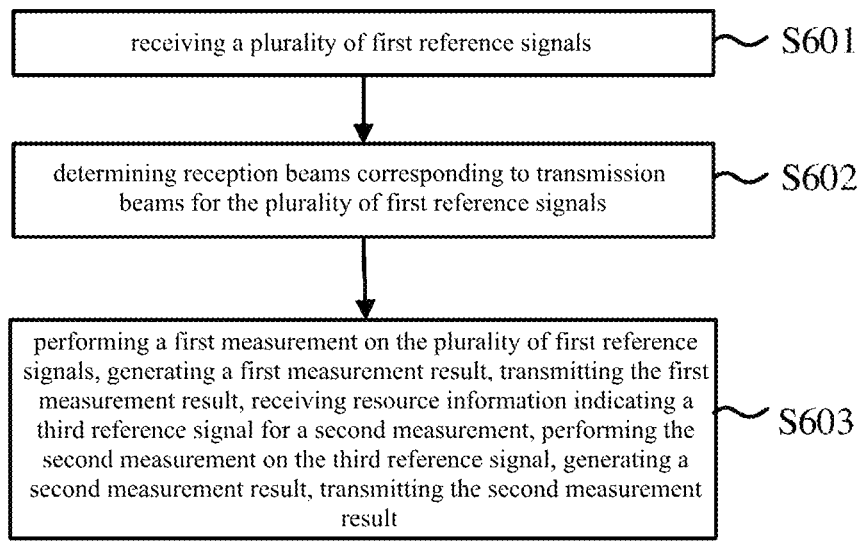
FIG. 6 shows a flowchart of a reception method performed by a user equipment corresponding to the transmission method shown in FIG. 5 according to another embodiment of the present disclosure.

FIG. 6 describes a reception method performed by a user equipment corresponding to a transmission method shown in FIG. 5 according to an embodiment of the present disclosure. FIG. 6 shows a flowchart of a reference signal reception method 600 for beam management.

As shown in FIG. 6, in step S601, a plurality of first reference signals are received, and the plurality of first reference signals are configured by a base station for measurement, or the plurality of first reference signals are configured by the base station to be active for measurement, or the plurality of first reference signals are configured by the base station for reporting. In step S602, reception beams corresponding to candidate transmission beams for the plurality of first reference signals are determined. Through the above steps, correspondences between transmission beams from the base station and reception beams from the UE are determined, which ensures that a reception beam from the UE may correspond to an optimal transmission beam from the base station.

According to one example of the embodiment, in step S601, the UE may further receive a plurality of groups of second reference signals, where a part of reference signals in each group of second reference signals are configured to include quasi co-located information, and the quasi co-located information indicates a correlation between resources for the group of second reference signals and resources for one first reference signal in the plurality of first reference signals; and then, the UE determines reception beams corresponding to candidate transmission beams for a plurality of second reference signals in the group of second reference signals. This process is similar to a process in which the UE determines the reception beams corresponding to the candidate transmission beams from the base station in the method 100, and details are not described herein again.

According to another example of the embodiment, after step S602, the UE may further perform step S603, that is, perform a first measurement on the first reference signal to generate a first measurement result; transmit the first measurement result; receive resource information indicating a third reference signal for a second measurement; perform a second measurement on the third reference signal to generate a second measurement result; and transmit the second measurement result.

In step S603, the first measurement result may be a first measurement performed by the UE on the first reference signal transmitted by the base station, or may be one measurement in a plurality of measurements performed by the UE on the first reference signal transmitted by the base station.

After step S603, after receiving the first measurement result, the base station may determine a reference signal for a next measurement (that is, a third reference signal for the second measurement) according to the first measurement result, and then the UE performs the second measurement on the third reference signal. After a plurality of measurements, an optimal transmission beam from the base station corresponding to the UE is finally determined.

The transmission method shown in FIG. 5 and the reception method shown in FIG. 6 described above are to realize correspondences between the candidate transmission beams from the base station and the reception beams from the UE, thereby ensuring that a reception beam from the UE may correspond to the optimal transmission beam from the base station. However, the transmission method shown in FIG. 5 described above may also be performed by the user equipment, while the reception method shown in FIG. 6 is performed by the base station, thereby realizing correspondences between transmission beams from the UE and reception beams from the base station, thereby ensuring that a reception beam from the base station may correspond to the optimal transmission beam from the UE, which is not limited in the present disclosure.

With the embodiment, the base station may configure a plurality of reference signals to be one of the three following configurations: being used for measurement, being active when used for measurement, and being used for reporting, so that the base station transmits a beam indication of a reference signal corresponding to each configuration according to actual needs, instead of transmitting beam indications of all reference signals each time, thus reducing resource overhead required for resource mapping indications and the beam indications that need to be transmitted by the base station.

Figure 7:
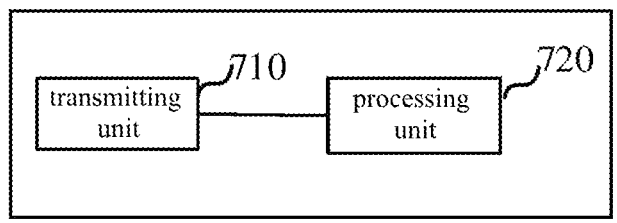
FIG. 7 shows a schematic structural diagram of a base station that performs the method shown in FIG. 1 according to an embodiment of the present disclosure.

Hereinafter, a base station that performs a method 100 shown in FIG. 1 according to an embodiment of the present disclosure is described with reference to FIG. 7. FIG. 7 shows a schematic structural diagram of the base station 700 that performs the method 100 shown in FIG. 1.

As shown in FIG. 7, the base station 700 includes a transmitting unit 710, and the transmitting unit 710 is configured to transmit a plurality of first reference signals and further configured to transmit a plurality of groups of second reference signals, where a first reference signal corresponds to a group of second reference signals, and the group of second reference signals includes a plurality of second reference signals. The base station 700 further includes a processing unit 720, and the processing unit 720 is configured to configure a part of reference signals in the group of second reference signals to include quasi co-located information, and the quasi co-located information indicates a correlation between resources for the group of second reference signals including the quasi co-located information and resources for the first reference signal corresponding to the group of second reference signals. In addition to these two units, the base station 700 may further include other components. However, since these components are not related to the content of the embodiment of the present disclosure, their illustrations and descriptions are omitted here. Furthermore, since the specific details of the following operations performed by the base station 700 according to the embodiment of the present disclosure are the same as the details described above with reference to FIGS. 2-3, repeated descriptions of the same details are omitted here to avoid repetition.

According to one example of the embodiment, a first reference signal may be a first synchronization signal. For example, the first synchronization signal may be a SS used as the first reference signal. According to another example of the embodiment, the first reference signal may be a first channel state information reference signal. For example, the first channel state information reference signal may be a CSI-RS used as the first reference signal.

According to another example of the embodiment, resources occupied by the first reference signal may be one resource block in a resource pool. For example, when the first reference signal is an SS, the resources occupied by the first reference signal is one SS block. For another example, when the first reference signal is a CSI-RS, the resources occupied by the first reference signal is one CSI-RS block.

Furthermore, in practical applications, the first reference signal may include a resource mapping indication corresponding to the first reference signal, to indicate the resource block occupied by the first reference signal. For example, the first reference signal may include a resource mapping indication SS block #1 to indicate that the resource block occupied by the first reference signal is the first SS block in the resource pool. For another example, the first reference signal may include a resource mapping indication CSI-RS block #2 to indicate that the resource block occupied by the first reference signal is the second CSI-RS block in the resource pool.

According to one example of the embodiment, the transmitting unit 710 is further configured to transmit the first reference signals through a plurality of first beams. For example, the first beam may be a beam with a wide coverage range (hereinafter referred to as a "wide beam"). The base station then transmits a first reference signal corresponding to each wide beam on the wide beam.

In addition, the transmitting unit 710 is further configured to transmit a plurality of groups of second reference signals, where a first reference signal corresponds to a group of second reference signals, and the group of second reference signals includes a plurality of second reference signals. Furthermore, a part of reference signals in the group of second reference signals include the quasi co-located information, and the quasi co-located information indicates a correlation between resources for the group of second reference signals including the quasi co-located information and resources for the first reference signal corresponding to the group of second reference signals.

According to one example of the embodiment, the second reference signal may be a second CSI-RS or a DM-RS. For example, the second channel state information reference signal may be a CSI-RS used as the second reference signal.

According to another example of the embodiment, resources occupied by the second reference signal may be one resource block in a resource pool. For example, when the second reference signal is a CSI-RS, the resources occupied by the second reference signal is one CSI-RS block. For another example, when the second reference signal is a DM-RS, the resource occupied by the second reference signal is one DM-RS block.

Furthermore, in practical applications, the second reference signal may include a resource mapping indication corresponding to the second reference signal, to indicate the resource block occupied by the second reference signal. For example, the second reference signal may include a resource mapping indication CSI-RS block #3 to indicate that the resource block occupied by the second reference signal is the third CSI-RS block in the resource pool. For another example, the second reference signal may include a resource mapping indication DM-RS block #4 to indicate that the resource block occupied by the second reference signal is the fourth DM-RS block in the resource pool.

According to one example of the embodiment, the transmitting unit 710 is further configured to transmit the groups of second reference signals through a plurality of groups of second beams, where a first beam corresponds to a group of second beams. For example, each second beam in the group of second beams may be a beam with a narrow coverage range (hereinafter referred to as a "narrow beam").

According to one example of the embodiment, before the transmitting unit 710 transmits the plurality of groups of second reference signals, the processing unit 720 may configure each group of second reference signals. For example, for each group of second reference signals, the processing unit 720 configures the group of second reference signals to include a plurality of second reference signals, and configures a part of reference signals in the group of second reference signals to include the quasi co-located information that has been described in detail above. The quasi co-located information is used to indicate a correlation between resources for the group of second reference signals including the quasi-colocation information and resources for the first reference signal corresponding to the group of second reference signals, so that after receiving the group of second reference signals, the UE may determine reception beams corresponding to candidate transmission beams of the plurality of second reference signals in the group of second reference signals through the quasi co-located information.

For another example, for each group of second reference signals, the processing unit 720 may configure the group of second reference signals to include a plurality of second reference signals, and configure one reference signal in the group of second reference signals to include the quasi co-located information that has been described in detail above. For instance, the second reference signal S2-$i$-r in the group of second reference signals S2-$i$ mentioned above is configured to include the quasi co-located information, and the quasi co-located information is used to indicate a correlation between resources for the group of second reference signals S2-$i$ and the resources for the first reference signal S1-$i$ corresponding to the group of second reference signals S2-$i$, so that after receiving the group of second reference signals S2-$i$, the UE may determine reception beams corresponding to candidate transmission beams of the second reference signals S2-$i$-1, S2-$i$-2, . . . , S2-$i$-r, . . . S2-$i$-M in the group of second reference signals S2-$i$ through the quasi co-located information, where r is a positive integer and 1≤r≤M.

As mentioned above, the transmitting unit 710 transmits the first reference signals on the first beams (that is, the wide beams). After receiving the first reference signals, the UE may determine reception beams corresponding to candidate transmission beams for the first reference signals. A process of the determination may adopt technical solutions in the prior art, and the details are not described herein again.

In addition, as mentioned above, the transmitting unit 710 transmits the second reference signals on the second beams (that is, a narrow beams) in the group of second beams corresponding to the first beam. After receiving the second reference signals, the UE may determine reception beams corresponding to candidate transmission beams for the second reference signals, by indicating a correlation between resources for the group of second reference signals including the quasi co-located information and resources for the first reference signal corresponding to the group of second reference signals. For example, after receiving the second reference signals, the UE may judge whether the channel attributes of the first beam (that is, the wide beam) and the second beam (that is, the narrow beam) are similar by indicating a correlation between resources for the group of second reference signals including the quasi co-located information and resources for the first reference signal corresponding to the group of second reference signals. If they are similar, the reception beam corresponding to the candidate transmission beam for the second reference signal may be determined to be the one same as the reception beam corresponding to the candidate transmission beam for the first reference signal.

That is, two determination processes are described herein. The first determination is to determine the reception beam corresponding to the candidate transmission beam (wide beam) for the first reference signal, and the second determination is to determine the reception beam corresponding to the candidate transmission beam for the second beams (narrow beams) in the group of second beams corresponding to a first beam, finally accurately realizing correspondences between the narrow beams from the base station and the reception beams from the UE, and ensuring that a reception beam from the UE may correspond to the optimal transmission beam from the base station. Therefore, the first determination process may be considered as a process that preliminary determines the correspondences between the transmission beams from the base station and the reception beams from the UE, which may be simply referred to as the "P1 process", and the second determination process may be considered as a process that subtly determines the correspondences between the transmission beams from the base station and the reception beams from the UE, which also be simply referred to as a "P2 process".

Figure 8:
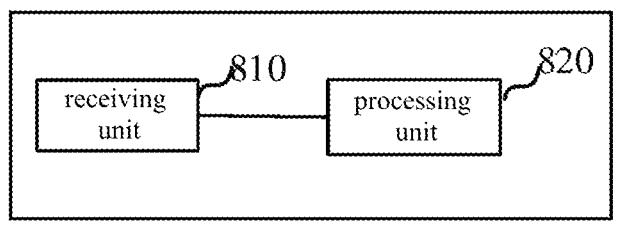
FIG. 8 shows a schematic structural diagram of a user equipment that performs the method shown in FIG. 4 according to an embodiment of the present disclosure.

FIG. 8 describes a user equipment that performs a method 400 shown in FIG. 4 according to an embodiment of the present disclosure. FIG. 8 shows a schematic structural diagram of the user equipment 800 that performs the method 400 shown in FIG. 4.

As shown in FIG. 8, the user equipment includes a receiving unit 810, and the receiving unit 810 is configured to receive a plurality of first reference signals and further configured to receive a plurality of groups of second reference signals, where a first reference signal corresponds to a group of second reference signals, and the group of second reference signals includes a plurality of second reference signals, where a part of reference signals in the group of second reference signals include quasi co-located information, and the quasi co-located information indicates a correlation between resources for the group of second reference signals including the quasi co-located information and resources for the first reference signal corresponding to the group of second reference signals. The user equipment further includes a processing unit 820, and the processing unit 820 is configured to determine reception beams corresponding to candidate transmission beams of the plurality of second reference signals in the group of second reference signals according to the quasi co-located information. In addition to these two units, the user equipment 800 may further include other components. However, since these components are not related to the content of the embodiment of the present disclosure, their illustrations and descriptions are omitted here. Furthermore, since the specific details of the following operations performed by the user equipment 800 according to the embodiment of the present disclosure are the same as the details described above with reference to FIGS. 2-3, repeated descriptions of the same details are omitted here to avoid repetition.

According to one example of the embodiment, after the receiving unit 810 receives first reference signals transmitted through first beams (that is, wide beams), the processing unit 820 may determine reception beams corresponding to candidate transmission beams for the first reference signal.

Furthermore, after the receiving unit 810 receives second reference signals transmitted on second beams (that is, narrow beams) in a group of second beams corresponding to the first beam, the processing unit 820 may determine reception beams corresponding to candidate transmission beams for the second reference signals, by indicating a correlation between resources for the group of second reference signals including the quasi co-located information and resources for the first reference signal corresponding to the group of second reference signals. For example, the UE may be judged whether channel attributes of the first beam (that is, the wide beam) and the second beam (that is, the narrow beam) are similar by indicating a correlation between resources for the group of second reference signals including the quasi co-located information and resources for the first reference signal corresponding to the group of second reference signals. If they are similar, the reception beam corresponding to the candidate transmission beams for the second reference signal may be determined to be the one same as the reception beam corresponding to the candidate transmission beams for the first reference signal, finally accurately realizing correspondences between the narrow beams from a base station and the reception beams from the UE, and ensuring that a reception beam from the UE may correspond to the optimal transmission beam from the base station.

With the embodiment, the base station configures, quasi co-located information between resources for one group of second reference signals and resources for a first reference signal corresponding to the group of second reference signals, to be transmitted in a part of reference signals in the group of second reference signals, instead of transmitting, quasi co-located information between resources for each reference signal in the group of second reference signals and resources for a first reference signal corresponding to the group of second reference signals, in each reference signal in the group of second reference signals, thereby achieving a goal of reducing resource overhead required for quasi-location information among resources for reference signals.

Figure 9:
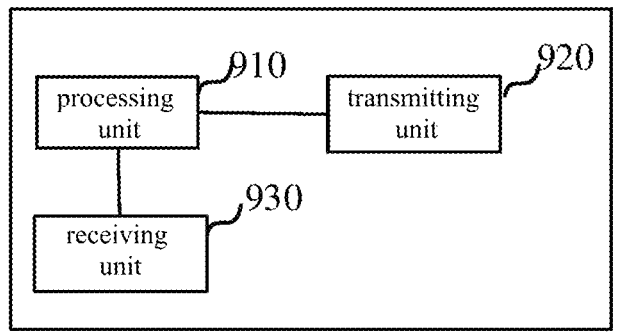
FIG. 9 shows a schematic structural diagram of a base station that performs the method shown in FIG. 5 according to an embodiment of the present disclosure.

Hereinafter, a base station that performs a method 500 shown in FIG. 5 according to an embodiment of the present disclosure is described with reference to FIG. 9. FIG. 9 shows a schematic structural diagram of a base station 900 that performs the method 500 shown in FIG. 5.

As shown in FIG. 9, the base station 900 includes a processing unit 910, and the processing unit 910 is used to configure a plurality first reference signals. The base station 900 further includes a transmitting unit 920, and the transmitting unit 920 is configured to transmit the plurality of first reference signals or a first part of first reference signals in the plurality of first reference signals for measurement. In addition to these two units, the base station 900 may further include other components. However, since these components are not related to the content of the embodiment of the present disclosure, their illustrations and descriptions are omitted here. Furthermore, since the specific details of the following operations performed by the base station 900 according to the embodiment of the present disclosure are the same as the details described above with reference to FIGS. 2-3, repeated descriptions of the same details are omitted here to avoid repetition.

According to one example of the embodiment, a first reference signal may be a first reference signal in the method 100, or may be a second reference signal in the method 100.

According to another example of the embodiment, the transmitting unit 920 may transmit the first reference signal through a first beam or a second beam. As mentioned above, the first reference signal may be a first reference signal in the method 100 described above in connection with FIG. 1, and therefore, in the example, the first reference signal may be transmitted through a first beam in the method 100 described in connection with FIG. 1. Furthermore, the first reference signal may be a second reference signal in the method 100 described above in connection with FIG. 1, and therefore, in the example, the first reference signal may be transmitted through a second beam in the method 100 described in connection with FIG. 1.

In addition, in the example, a corresponding first reference signal may be transmitted on each first beam in a plurality of first beams, or a corresponding first reference signal may be transmitted on a part of first beams in the plurality of first beams. Alternatively, a corresponding first reference signal may also be transmitted on each second beam in a plurality of second beams, and a corresponding first reference signal may also be transmitted on a part of second beams in the plurality of second beams.

According to another example of the embodiment, the processing unit 910 may further configure the first part of first reference signals in the plurality of first reference signals to be activated for measurement. For example, the number of the plurality of first reference signals is 16, and the number of the first part of first reference signals in the 16 first reference signals is 8, and the 8 first reference signals are further configured to be activated for measurement. As it should be, the first part of first reference signals may be further configured to be active for reporting, and the first part of first reference signals may be further configured to be active for measurement or reporting.

In the example, when the processing unit 910 configures the first part of first reference signals, the first part of first reference signals may be configured through signaling. For example, the first part of first reference signals are configured through RRC signaling or Media Access Control Control Element (MAC CE) signaling.

In the example, the processing unit 910 may further use a second part of first reference signals in the first part of first reference signals for reporting. For example, the number of the plurality of first reference signals is 16, and the number of the first part of first reference signals in the 16 first reference signals is 8, and the number of the second part of first reference signals in the 8 first reference signals is 4, and the 4 first reference signals are further configured for reporting.

Furthermore, when the base station configures the second part of first reference signals, the first part of first reference signals may be configured through signaling. For example, the second part of first reference signals are configured through RRC signaling, or MAC CE signaling, or Downlink Control Information (DCI) signaling. Moreover, resources occupied by the second part of first reference signals may be part or all of resources used for RRC signaling, or MAC CE signaling, or DCI signaling.

That is, the processing unit 910 may configure the plurality of first reference signals into different levels (or sets) according to actual needs, for example, into a plurality of levels (or sets). For instance, the plurality of first reference signals are configured into three levels (or sets), where a first level (or set) of first reference signals is configured for measurement, and a second level (or set) of first reference signals is configured to be active for measurement, and a third level (or set) of first reference signals is configured for reporting. Although, in the embodiment, only three levels (or sets) are introduced, in actual operations, less than three or more than three levels (or sets) may be divided according to specific situations. In the prior art, the base station does not configure the plurality of first reference signals into a plurality of levels (or sets), which results in that, the base station needs to transmit all reference signals in the plurality of first reference signals and transmit beam indications of all reference signals in the plurality of first reference signals each time for measurement by a UE in order to determine reception beams from the UE.

In the prior art, since the base station needs to transmit all reference signals in the plurality of first reference signals and the corresponding beam indications each time, overhead required for transmitting resource mapping indications of the reference signals each time is very large, and as a result, overhead required for transmitting the beam indications each time is very large. For example, the number of the plurality of first reference signals is 16. In the prior art, the number of the resource mapping indications required for transmitting 16 first reference signals each time is 16, and 4 bits are required to transmit the resource mapping indications. Moreover, the number of the beams for transmitting the 16 first reference signal beams each time is 16, that is, the number of the corresponding beam indications is 16, which also requires 4 bits to be transmitted, and a total overhead of 8 bits is required.

In the example, since the processing unit 910 may configure the plurality of first reference signals into a plurality of levels (or sets), and then transmit different levels (or sets) of first reference signals according to actual needs. Therefore, the transmitting unit 920 does not need to transmit all reference signals in the plurality of first reference signals and the corresponding beam indications, thereby reducing overhead required for transmitting resource mapping indications of the reference signal and the corresponding beam indications. For example, the number of the plurality of first reference signals is 16, and 8 of the 16 first reference signals are further configured to be active for measurement, and 4 of the 8 first reference signals are further configured for reporting. If the base station only needs to transmit 8 of the 16 first reference signals according to actual needs, the number of the resource mapping indications required by base station for transmitting 8 first reference signals is 8, and 3 bits are required to transmit the resource mapping indication. The number of beams for transmitting 8 first reference signal is 8, that is, the number of the corresponding beam indications is 8, and 3 bits are required to transmit the beam indications. A total overhead of 6 bits is required, which obviously saves the overhead compared with the prior art where all of the 16 first reference signals are transmitted. For another example, if the base station only needs to transmit 4 of the 8 first reference signals according to actual needs, the number of the resource mapping indications required by base station for transmitting 4 first reference signals is 4, and 2 bits are required to transmit the resource mapping indications. The number of beams for transmitting 4 first reference signal is 4, that is, the number of the corresponding beam indications is 4, and 2 bits are required to transmit the beam indications. A total overhead of 4 bits is required, which obviously saves the overhead compared with the prior art where all of the 16 first reference signals are transmitted.

As mentioned above, the processing unit 910 may configure the plurality of first reference signals into a plurality of levels (or sets), and then choose to transmit different levels (or sets) of first reference signals according to actual needs. The actual needs may be that, for example, if a location of the UE changes, a direction of a previously determined optimal transmission beam from the base station may deviate from the UE, and as a result, the UE may not receive high-quality wireless signals. In this case, The UE may transmit request information for reselecting an optimal transmission beam from the base station to the base station. After receiving the request information, the base station does not need to transmit to the user the first reference signals corresponding to all beams on all beams including the previously determined optimal transmission beam from the base station, and does not need to transmit to the user the beam indications of all beams for measurement by the UE in order to determine the reception beam from the UE. Therefore, the base station only needs to transmit a first reference signal corresponding to an adjacent beam of the previously determined optimal transmission beam from the base station and the beam indication of the adjacent beam, or transmit a first reference signal corresponding to other sets of beams outside a set to which the previously determined optimal transmission beam of the base station belongs and the set of beams and/or beam indications of the beams.

According to one example of the embodiment, the processing unit 910 may further configure a plurality of groups of second reference signals, where each group of second reference signals includes a plurality of second reference signals, and a part of second reference signals in the group of second reference signals may also include quasi co-located information. Then, the base station transmits the plurality of groups of second reference signals.

In the example, the first reference signals configured by the processing unit 910 are similar to the first reference signals in the method 100, and the group of second reference signals configured by the processing unit 910 are similar to the group of second reference signals in the method 100, which are not described in detail herein again.

For the quasi co-located information included in a part of reference signals in each group of second reference signals, the processing unit 910 may configure it in the following manner. For example, when the group of second reference signals corresponds to one first reference signal of the plurality of first reference signals, a part of reference signals in the group of second reference signals are configured to include quasi co-located information, and the quasi co-located information indicates a correlation between resources for the group of second reference signals and resources for one first reference signal in the plurality of first reference signals. When the group of second reference signals corresponds to one first reference signal in the first part of first reference signals, a part of reference signals in the group of second reference signals are configured to include quasi co-located information, and the quasi co-located information indicates a correlation between resources for the group of second reference signals and resources for one first reference signal in the first part of first reference signals. When the group of second reference signals corresponds to one first reference signal in the second part of first reference signals, a part of reference signals in the group of second reference signals are configured to include quasi co-located information, and the quasi co-located information indicates a correlation between resources for the group of second reference signals and resources for one first reference signal in the second part of first reference signals.

That is, for the different levels (or sets) of first reference signals mentioned above, a configuration manner of the quasi co-located information included in a part of reference signals in each group of second reference signals is different.

According to another example of the embodiment, the base station 900 further includes a receiving unit 930 for receiving a first measurement result, where the first measurement result is a result of performing a first measurement on the first reference signal; determine a third reference signal for a second measurement according to the first measurement result; and transmit resource information indicating the third reference signal for the second measurement, where the third reference signal includes: a third reference signal used for measurement but not used for reporting; or a third reference signal used for measurement but not activated; or a third reference signal activated but not used for reporting.

In the example, the first measurement result may be a first measurement performed by the UE on the reference signal transmitted by the base station, or may be one measurement in a plurality of measurements performed by the UE on the reference signal transmitted by the base station.

In the example, after the receiving unit 930 is configured to, receive the first measurement result, the processing unit 910 may determine a reference signal for the next measurement (that is, a third reference signal for the second measurement) according to the first measurement result. The third reference signal may be the same as or different from the first reference signal during the first measurement, which is determined by the base station according to the actual channel condition and is not limited in the present disclosure.

For example, the third reference signal may be the same as a part of the first reference signals during the first measurement. As mentioned above, since the processing unit 910 configures the plurality of first reference signals into three levels (or sets) according to actual needs, the transmitting unit 920 may transmit a first level (or set) of first reference signals during the first measurement, and may transmit a second level (or set) of first reference signals or a third level (or set) of first reference signals during the second measurement, so that the UE may quickly determine the optimal transmission beam from the base station. For another example, the transmitting unit 920 may transmit 16 first reference signals at the first level (or set) during the first measurement, and may transmit 8 first reference signals at the second level (or set) in the 16 first reference signals or 4 first reference signals at the third level (or set) in the 8 first reference signals during the second measurement.

For another example, the third reference signal may be different from the first reference signal during the first measurement. For instance, the transmitting unit 920 may transmit 16 first reference signals at the first level (or set) during the first measurement, and then the third reference signals may be the first reference signals that are not at the third level (or set) in the 16 first reference signals at the first level (or set), and may also be the first reference signals that are not at the second level (or set) in the 16 first reference signals at the first level (or set), and may also be the first reference signals that are not at the third level (or set) in the 8 first reference signals at the second level (or set).

In the example, after the processing unit 910 determines the reference signal for the next measurement (that is, the third reference signal for the second measurement), the transmitting unit 920 may transmit to the UE the resource information indicating the third reference signal for the second measurement for measurement by the UE to determine the optimal transmission beam from the base station. For example, the resource information of the third reference signal may include an indication of a beam for transmitting the third reference signal.

As mentioned above, since the processing unit 910 configures the plurality of first reference signals into three levels (or sets) according to actual needs, in the example, overhead required for the beam indications transmitted by the transmitting unit 920 is also reduced. For example, when the transmitting unit 920 may transmit 8 first reference signals at the second level (or set) in the 16 first reference signals at the first level (or set) during the second measurement, the number of the corresponding beam indications transmitted by the transmitting unit 920 is 8 and only 3 bits are required, which obviously saves the overhead compared with 4 bits in the prior art. When the transmitting unit 920 transmits 4 first reference signals at the third level (or set) in the 8 first reference signals, the number of the corresponding beam indications transmitted by the transmitting unit 920 is 4 and only 2 bits are required, which obviously saves the overhead compared with 4 bits in the prior art.

Figure 10:
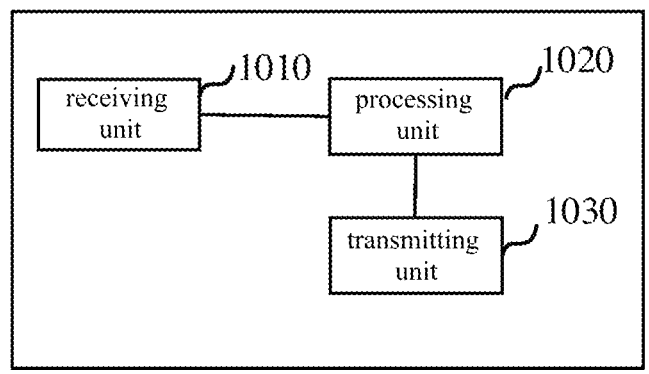
FIG. 10 shows a schematic structural diagram of a user equipment that performs the method shown in FIG. 6 according to an embodiment of the present disclosure.

FIG. 10 describes a user equipment that performs a method 600 shown in FIG. 6 according to an embodiment of the present disclosure. FIG. 10 shows a schematic structural diagram of a user equipment 1000 that performs the method 600 shown in FIG. 6.

As shown in FIG. 10, the user equipment includes a receiving unit 1010, and the receiving unit 1010 is configured to receive a plurality of first reference signals, and the plurality of first reference signals are configured by a base station for measurement, or the plurality of first reference signals are configured by the base station to be active for measurement, or the plurality of first reference signals are configured by the base station for reporting. The user equipment further includes a processing unit 1020, and the processing unit 1020 is configured to determine reception beams corresponding to candidate transmission beams for the plurality of first reference signals. Through the user equipment described above, correspondences between transmission beams from the base station and reception beams of the UE is determined, which ensures that a reception beam from the UE may correspond to an optimal transmission beam from the base station.

According to one example of the embodiment, the receiving unit 1010 may further receive a plurality of groups of second reference signals, where a part of reference signals in each group of second reference signals are configured to include quasi co-located information, and the quasi co-located information indicates a correlation between resources for the group of second reference signals and resources for one first reference signal in the plurality of first reference signals; and then, the processing unit 1020 determines reception beams corresponding to candidate transmission beams for a plurality of second reference signals in the group of second reference signals. This process is similar to a process in which the UE determines the reception beams corresponding to the candidate transmission beams from the base station in the method 100, and details are not described herein again.

According to one example of the embodiment, the processing unit 1020 may further perform a first measurement on the first reference signal to generate a first measurement result. The user equipment 1000 further includes a transmitting unit 1030, and the transmitting unit 1030 is configured to transmit the first measurement result. The receiving unit 1010 is further configured to receive resource information indicating a third reference signal for a second measurement, and the processing unit 1020 is further configured to perform a second measurement on the third reference signal to generate a second measurement result. Finally, the transmitting unit 1030 is configured to transmit the second measurement result.

In the example, the first measurement result may be a first measurement performed by the UE on the first reference signal transmitted by the base station, or may be one measurement in a plurality of measurements performed by the UE on the first reference signal transmitted by the base station.

In the example, after receiving the first measurement result, the base station may determine a reference signal for a next measurement (that is, a third reference signal for the second measurement) according to the first measurement result, and then the processing unit 1020 performs the second measurement on the third reference signal. After a plurality of measurements, an optimal transmission beam from the base station corresponding to the UE is finally determined.

With the embodiment, the base station may configure a plurality of reference signals to be one of the three following configurations: being used for measurement, being active when used for measurement, and being used for reporting, so that the base station transmits a beam indication of a reference signal corresponding to each configuration according to actual needs, instead of transmission beam indications of all reference signals each time, thus reducing resource overhead required for resource mapping indications and the beam indications that need to be transmitted by the base station.

It should be noted that block diagrams used for the illustration of the above embodiments represent blocks in units. These components may be realized by any combination of hardware and/or software. In addition, the means for implementing respective components is not particularly limited. That is, respective functional blocks may be realized by one apparatus that is physically and/or logically aggregated, or may be realized by directly and/or indirectly (for example, wired and/or wireless) connecting two or more physically and/or logically separate apparatuses and using the plurality of apparatuses.

Figure 11:
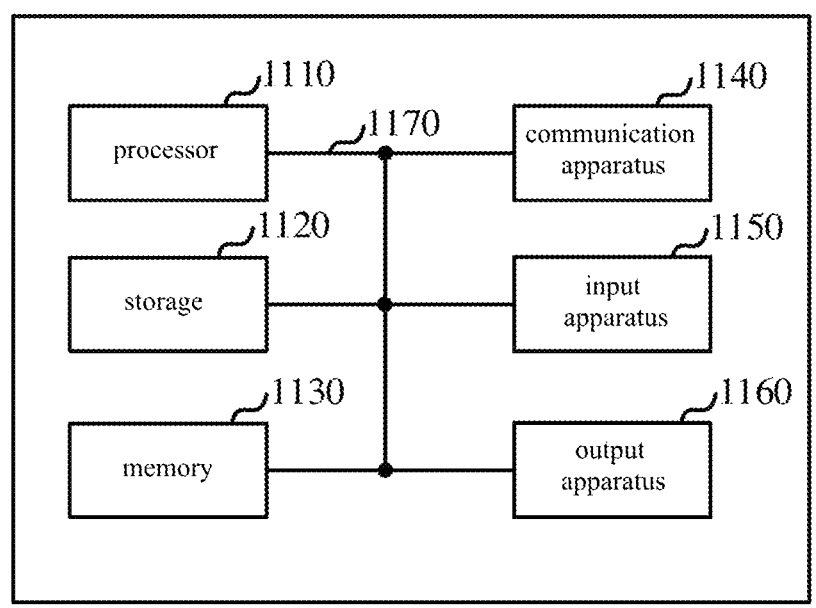
FIG. 11 shows a schematic diagram of a hardware structure of an involved user equipment according to an embodiment of the present disclosure.

For example, the user equipment in the embodiment of the present disclosure can function as a computer that executes the processing of the reference signal transmission method for beam management of the present disclosure. FIG. 11 is a schematic diagram illustrating a hardware structure of a related user equipment 1100 according to an embodiment of the present disclosure. The above described user equipment 1100 may be physically designed as a computer apparatus including a processor 1110, a storage 1120, a memory 1130, a communication apparatus 1140, an input apparatus 1150, an output apparatus 1160, and a bus 1170 and the like.

It should be noted that, in the following description, the word "apparatus" may be replaced by "circuit", "device", "unit" and so on. It should be noted that the hardware structure of a user equipment 1100 may be designed to include one or more of each apparatus shown in the drawings, or may be designed not to include part of the apparatus.

For example, although only one processor 1110 is shown, a plurality of processors may be provided. Furthermore, processes may be implemented with one processor, or processes may be implemented either simultaneously or in sequence, or in different manners, on two or more processors. It should be noted that the processor 1110 may be implemented with one or more chips.

Each function of the user equipment 1100 is implemented by reading predetermined software (program) on hardware such as the processor 1110 and the memory 1120, so as to make the processor 1110 perform calculations, and by controlling the communication carried out by the communication apparatus 1140, and the reading and/or writing of data in the memory 1120 and the storage 1130.

The processor 1110 may control the whole computer by, for example, running an operating system. The processor 1110 may be configured with a central processing unit (CPU), which includes interfaces with peripheral apparatus, control apparatus, computing apparatus, and a register and so on. For example, the above described baseband signal processing unit, call processing unit, and the like may be implemented by the processor 1110.

Furthermore, the processor 1110 reads programs (program codes), software modules or data, from the storage 1130 and/or the communication apparatus 1140, into the memory 1120, and executes various processes according to these. As for the programs, programs to allow computers to execute at least part of the operations of the above-described embodiments may be used. For example, control unit of user equipment 1100 may be implemented by a control program stored in the memory 1120 and operated by the processor 1110, and may also be implemented similarly for other function blocks.

The memory 1120 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1120 may be referred to as a "register", a "cache", a "main memory" (primary storage apparatus) and so on. The memory 1120 can store executable programs (program codes), software modules and so on for implementing the wireless communication methods according to embodiments of the present disclosure.

The storage 1130 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1130 may be referred to as "secondary storage apparatus."

The communication apparatus 1140 is hardware (transmitting/receiving device) for allowing inter-computer communication by using wired and/or wireless networks, and may be referred to as, for example, a "network device", a "network controller", a "network card", a "communication module" and so on. The communication apparatus 1140 may be configured to include a high frequency switch, a duplexer, a filter, a frequency synthesizer and so on in order to realize, for example, frequency division duplex (FDD) and/or time division duplex (TDD). For example, the above described transmitting and receiving antenna, amplifying unit, transmitting and receiving unit, and transmission path interface, and so on, may be implemented by the communication device 1040.

The input apparatus 1150 is an input device for receiving input from the outside (for example, a keyboard, a mouse, a microphone, a switch, a button, a sensor and so on). The output apparatus 1160 is an output device for allowing sending output to the outside (for example, a display, a speaker, an LED (Light Emitting Diode) lamp and so on). It should be noted that the input apparatus 1150 and the output apparatus 1160 may be provided in an integrated structure (for example, a touch panel).

Furthermore, these pieces of apparatus, including the processor 1110, the memory 1120 and so on are connected by the bus 1170 so as to communicate information. The bus 1170 may be formed with a single bus, or may be formed with buses that vary between pieces of apparatus.

Also, the user equipment 1100 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1110 may be installed with at least one of these pieces of hardware.

It should be noted that the terms illustrated in the present specification and/or the terms required for the understanding of the present specification may be substituted with terms having the same or similar meaning. For example, a channel and/or a symbol may be a signal. In addition, the signal may be a message. A reference signal may be abbreviated as an "RS (Reference Signal)", and may be referred to as a "pilot", a "pilot signal" and so on, depending on which standard applies. In addition, a component carrier (CC) may be referred to as a carrier frequency, a cell, or the like.

In addition, the wireless frame may be composed of one or more periods (frames) in the time domain. Each of the one or more periods (frames) constituting the wireless frame may also be referred to as a subframe. Further, a subframe may be composed of one or more slots in the time domain. The subframe may be a fixed length of time duration (eg, 1 ms) that is independent of the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Furthermore, the slot may also be a time unit configured based on parameter. Furthermore, a slot may also include multiple microslots. Each microslot may be comprised of one or more symbols in the time domain. Furthermore, a microslot may also be referred as "a subframe".

A wireless frame, a subframe, a slot, a microslot and a symbol all represent the time unit when transmitting signals.

A wireless frame, a subframe, a slot, a microslot and a symbol may also use other names that correspond to each other. For example, one subframe may be referred to as a "transmission time interval (TTI)", and a plurality of consecutive subframes may also be referred to as a "TTI", and one slot or one microslot may also be referred to as a "TTI." That is, a subframe and/or a TTI may be a subframe (1 ms) in existing LTE, may be a shorter period than 1 ms (for example, one to thirteen symbols), or may be a longer period of time than 1 ms. It should be noted that a unit indicating a TTI may also be referred to as a slot, a microslot, or the like instead of a subframe.

Here, a TTI refers to the minimum time unit of scheduling in wireless communication, for example. For example, in LTE systems, a wireless base station schedules the wireless resources (such as the frequency bandwidth and transmission power that can be used in each user terminal) to allocate to each user terminal in TTI units. It should be noted that the definition of TTIs is not limited to this.

TTIs may be channel-coded data packets (transport blocks), code blocks, and/or codeword transmission time units, or may be the unit of processing in scheduling, link adaptation and so on. It should be noted that, when a TTI is given, the time interval (e.g., the number of symbols) actually mapped to the transport block, code block, and/or codeword may also be shorter than the TTI.

It should be noted that, when one slot or one microslot is called a TTI, more than one TTI (i.e., more than one slot or more than one microslot) may also become the scheduled minimum time unit. Furthermore, the number of slots (the number of microslots) constituting the minimum time unit of the scheduling may be controlled.

A TTI having a time duration of 1 ms may be referred to as a "normal TTI" (TTI in LTE Rel. 8 to 12), a "standard TTI", a "long TTI", a "normal subframe", a "standard subframe", or a "long subframe", and so on. A TTI that is shorter than a normal TTI may be referred to as a "shortened TTI", a "short TTI", a "partial (or fractional) TTI", a "shortened subframe", a "short subframe", a "microslot", or a "short microslot" and so on.

It should be noted that, a long TTI (eg, a normal TTI, a subframe, etc.) may be replaced with a TTI having a time duration exceeding 1 ms, and a short TTI (eg, a shortened TTI, and so on) may also be replaced with a TTI having a TTI duration shorter than the long TTI and a TTI duration exceeding 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one microslot, one subframe or one TTI duration. One TTI and one subframe each may be comprised of one or more resource blocks, respectively. It should be noted that one or more RBs may also be referred to as a "physical resource block (PRB (Physical RB))", a "Sub-Carrier Group (SCG)", a "Resource Element Group (REG)", a "PRG pair", an "RB pair" and so on.

Also, a resource block may also be composed of one or more resource elements (RE). For example, one RE can be a wireless resource area of a subcarrier and a symbol.

It should be noted that the above-described structures of wireless frames, subframes, slots, microslots and symbols and so on are simply examples. For example, configurations such as the number of subframes included in a wireless frame, the number of slots of each subframe or wireless frame, the number or microslots included in a slot, the number of symbols and RBs included in a slot or microslot, the number of subcarriers included in an RB, the number of symbols in a TTI, the symbol duration and the cyclic prefix (CP) duration can be variously changed.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, since various channels (PUCCH, PDCCH and so on) and information elements can be identified by any suitable names, the various names assigned to these various channels and information elements are not limited in any respect.

The information, signals and so on described in this specification may be represented by using any one of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on that are input and/or output may be overwritten, updated or appended. The information, signals and so on that are output may be deleted. The information, signals and so on that are input may be transmitted to other apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

It should be noted that physical layer signaling may also be referred to as L1/L2 (Layer 1/Layer 2) control information (L1/L2 control signals), L1 control information (L1 control signal) and so on. Also, RRC signaling may be referred to as "RRC messages", and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of "X holds") does not necessarily have to be carried out explicitly, and can be carried out implicitly (by, for example, not reporting this piece of information, or by reporting a different piece of information).

Regarding decisions, which may be made in values represented by one bit (0 or 1), may be made by a true or false value (Boolean value) represented by true or false, or may be made by comparing numerical values (for example, comparison against a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of communication media.

The terms "system" and "network" as used herein are used interchangeably.

In the present specification, the terms "base station (BS)", "radio base station", "eNB", "gNB", "cell", "sector", "cell group", "carrier" and "component carrier" may be used interchangeably. A base station may be referred to as a "fixed station", "NodeB", "eNodeB (eNB)", "access point", "transmission point", "receiving point", "femto cell", "small cell" and so on.

A base station can accommodate one or more (for example, three) cells (also referred to as "sectors"). When a base station accommodates a plurality of cells, the entire coverage area of the base station can be partitioned into a plurality of smaller areas, and each smaller area can provide communication services with base station subsystems (for example, indoor small base stations (RRHs (Remote Radio Heads))). The term "cell" or "sector" refers to part or all of the coverage area of a base station and/or a base station subsystem that provides communication services within this coverage.

In the present specification, the terms "mobile station (MS)", "user terminal", "user equipment (UE)" and "terminal" may be used interchangeably. A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the radio base station may have the functions of the user terminal. In addition, terms such as "uplink" and "downlink" may be interpreted as "side." For example, an uplink channel may be interpreted as a side channel.

Likewise, the user terminals in this specification may be interpreted as radio base stations. In this case, the radio base stations may have the functions of the user terminals described above.

In the present specification, it is assumed that certain actions to be performed by base station may, in some cases, be performed by its higher node (upper node). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000 (Code Division Multiple Access), UMB (Ultra Mobile Broadband), IEEE 802.11 (Wi-Fi (registered trademark)), IEEE 802.16 (WiMAX (registered trademark)), IEEE 920.20, UWB (Ultra-WideB and), Bluetooth (registered trademark) and other adequate radio communication methods, and/or next-generation systems that are enhanced based on these.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include", "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present disclosure has been described in detail above, it should be obvious to a person skilled in the art that the present disclosure is by no means limited to the embodiments described herein. The present disclosure can be implemented with various corrections and in various modifications, without departing from the spirit and scope of the present disclosure defined by the recitations of claims. Consequently, the description herein is provided only for the purpose of explaining examples, and should by no means be construed to limit the present disclosure in any way.

What is claimed is:

1. A base station comprising:
   a transmitting unit configured to transmit a plurality of first reference signals;
   the transmitting unit further configured to transmit a plurality of groups of second reference signals, wherein a first reference signal corresponds to a group of second reference signals, and the group of second reference signals includes a plurality of second reference signals; and
   a processing unit configured to configure a part of reference signals in the group of second reference signals to include quasi co-located information, the quasi co-located information indicating a correlation between resources for the group of second reference signals including the quasi co-located information and resources for the first reference signal corresponding to the group of second reference signals,
   wherein the processing unit is further configured to:
   when a first type of first reference signal in the plurality of first reference signals is a first synchronization signal, and a second type of first reference signal in the plurality of first reference signals is a first channel state information reference signal,
   configure a part of reference signals in the group of second reference signals corresponding to the first type of first reference signal to include quasi co-located information, the quasi co-located information indicating a correlation between resources for the group of second reference signals corresponding to the first type of first reference signal and resources for the first synchronization signal, and
   configure a part of reference signals in the group of second reference signals corresponding to the second type of first reference signal to include quasi co-located information, the quasi co-located information indicating a correlation between resources for the group of second reference signals corresponding to the second type of first reference signal and resources for the first channel state information reference signal.

2. The base station according to claim 1, wherein the first reference signal is a first synchronization signal or a first channel state information reference signal, and the second reference signal is a second channel state information reference signal or a demodulation reference signal.

3. A terminal comprising:
   a receiving unit configured to receive a plurality of first reference signals;
   the receiving unit further configured to receive a plurality of groups of second reference signals, wherein a first reference signal corresponds to a group of second reference signals, and the group of second reference signals includes a plurality of second reference signals, wherein a part of reference signals in the group of second reference signals include quasi co-located information, and the quasi co-located information indicates a correlation between resources for the group of second reference signals including the quasi co-located information and resources for the first reference signal corresponding to the group of second reference signals; and
   a processing unit configured to determine reception beams corresponding to candidate transmission beams for a plurality of second reference signals in the group of second reference signals,
   wherein when a first type of first reference signal in the plurality of first reference signals is a first synchronization signal, and a second type of first reference signal in the plurality of first reference signals is a first channel state information reference signal,
   a part of reference signals in the group of second reference signals corresponding to the first type of first reference signal includes quasi co-located information, the quasi co-located information indicates a correlation between resources for the group of second reference signals corresponding to the first type of first reference signal and resources for the first synchronization signal, and
   a part of reference signals in the group of second reference signals corresponding to the second type of first reference signal includes quasi co-located information, the quasi co-located information indicates a correlation between resources for the group of second reference signals corresponding to the second type of first reference signal and resources for the first channel state information reference signal.

4. A terminal comprising:
   a receiving unit configured to receive a plurality of first reference signals, the plurality of first reference signals configured by a base station for measurement, or the plurality of first reference signals configured by the base station to be active for measurement, or the plurality of first reference signals configured by the base station for reporting; and
   a processing unit configured to determine reception beams corresponding to candidate transmission beams for the plurality of first reference signals,
   wherein the a part of reference signals in the group of second reference signals include quasi co-located information, and the quasi co-located information indicating a correlation between resources for the group of second reference signals including the quasi co-located information and resources for the first reference signal corresponding to the group of second reference signals includes:

when a first type of first reference signal in the plurality of first reference signals is a first synchronization signal, and a second type of first reference signal in the plurality of first reference signals is a first channel state information reference signal, a part of reference signals in the group of second reference signals corresponding to the first type of first reference signal includes quasi co-located information, and the quasi co-located information indicates a correlation between resources for the group of second reference signals corresponding to the first type of first reference signal and resources for the first synchronization signal, and a part of reference signals in the group of second reference signals corresponding to the second type of first reference signal includes quasi co-located information, and the quasi co-located information indicates a correlation between resources for the group of second reference signals corresponding to the second type of first reference signal and resources for the first channel state information reference signal.

5. The terminal according to claim 3, wherein the first reference signal is a first synchronization signal or a first channel state information reference signal, and the second reference signal is a second channel state information reference signal or a demodulation reference signal.

6. The terminal according to claim 4, further including:

a transmitting unit configured to transmit a first measurement result, wherein the first measurement result is a result of performing a first measurement on the first reference signal.

* * * * *